United States Patent
Waite et al.

(10) Patent No.: US 10,018,062 B2
(45) Date of Patent: Jul. 10, 2018

(54) AXIAL TRANSFER TUBE

(71) Applicant: United Technologies Corporation, Hartford, CT (US)

(72) Inventors: Ryan Alan Waite, Glastonbury, CT (US); Jeffrey Michael Jacques, East Hartford, CT (US); Benjamin F. Hagan, Manchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 505 days.

(21) Appl. No.: 14/790,589

(22) Filed: Jul. 2, 2015

(65) Prior Publication Data

US 2017/0002671 A1 Jan. 5, 2017

(51) Int. Cl.
*F01D 9/06* (2006.01)
*F01D 25/12* (2006.01)
*F01D 9/02* (2006.01)
*F16L 9/00* (2006.01)

(52) U.S. Cl.
CPC ............... *F01D 9/065* (2013.01); *F01D 9/02* (2013.01); *F01D 9/06* (2013.01); *F01D 25/12* (2013.01); *F16L 9/006* (2013.01); *F05D 2220/32* (2013.01); *F05D 2240/12* (2013.01); *F05D 2260/20* (2013.01); *Y02T 50/675* (2013.01)

(58) Field of Classification Search
CPC . F01D 9/06; F01D 9/065; F01D 25/12; F05D 2260/202; F05D 2260/208
USPC ................. 415/115, 116; 416/96 A
See application file for complete search history.

(56) References Cited

U.S. PATENT DOCUMENTS

| | | | |
|---|---|---|---|
| 4,492,517 A * | 1/1985 | Klompas | F01D 5/185 |
| | | | 415/115 |
| 6,227,798 B1 | 5/2001 | Demers et al. | |
| 2008/0112791 A1* | 5/2008 | Lee | F01D 9/065 |
| | | | 415/58.4 |
| 2014/0004293 A1 | 1/2014 | Grooms, II et al. | |
| 2015/0063983 A1* | 3/2015 | Boeck | F01D 5/081 |
| | | | 415/116 |

FOREIGN PATENT DOCUMENTS

EP 1580414 9/2005

OTHER PUBLICATIONS

English machine translation of EP 1 580 414, Sep. 2005.*
Extended European Search Report dated Dec. 6, 2016 in European Application No. 16167690.3.

* cited by examiner

Primary Examiner — Christopher Verdier

(57) ABSTRACT

What is described is a transfer tube for use with an airfoil of a gas turbine engine coupled to a platform. The transfer tube includes a main body having a first end defining an inlet configured to receive a flow of fluid and a second end defining an outlet for the flow of fluid, the main body having a curved section. The transfer tube also includes a first mating face coupled to the first end of the main body. The transfer tube also includes a second mating face coupled to the second end of the main body. At least one of the first mating face or the second mating face is configured to be coupled to a platform body of the outer diameter platform.

16 Claims, 4 Drawing Sheets

AXIAL TRANSFER TUBE

GOVERNMENT LICENSE RIGHTS

This disclosure was made with government support under FA 8650-09-2923-0021 awarded by The United States Air Force. The government has certain rights in the disclosure.

FIELD

The present disclosure relates generally to cooling systems for aircraft and, more particularly, to a transfer tube for transferring a flow of coolant between a hook of a platform and a main body of the platform.

BACKGROUND

Gas turbine engines typically include a fan section, a compressor section, a combustor section and a turbine section. The turbine section may include one or more stages of rotor blades that rotate about an engine centerline in response to receiving a flow of fluid and one or more vanes axially positioned between the stages of rotor blades for conditioning the flow of air. Each vane may be coupled to an outer diameter platform having a main body and a hook for coupling the outer diameter platform to a frame of the gas turbine engine. Due to relatively high temperatures in the turbine section, it is desirable to transfer a flow of coolant to the vanes for cooling the vanes. It may be desirable to transfer the flow of coolant from a hook of an outer diameter platform to a main body of the outer diameter platform, which may include turning the flow of coolant.

SUMMARY

What is described is a transfer tube for use with an airfoil of a gas turbine engine coupled to a platform. The transfer tube includes a main body having a first end defining an inlet configured to receive a flow of fluid and a second end defining an outlet for the flow of fluid, the main body having a curved section. The transfer tube also includes a first mating face coupled to the first end of the main body. The transfer tube also includes a second mating face coupled to the second end of the main body. At least one of the first mating face or the second mating face is configured to be coupled to a platform body of the outer diameter platform.

In any of the foregoing transfer tubes, the curved section has an angle of at least 20 degrees.

In any of the foregoing transfer tubes, the angle is between 80 degrees and 100 degrees.

Any of the foregoing transfer tubes may also include a first flange coupled to the first end and a second flange coupled to the second end, the first flange defining the first mating face and the second flange defining the second mating face.

In any of the foregoing transfer tubes, the transfer tube is configured to allow fluid to flow between a hook of the platform and the platform body of the platform.

In any of the foregoing transfer tubes, the platform is an outer diameter platform, the first mating face is configured to be coupled to the hook such that the inlet receives the flow of fluid from a hook channel of the hook, and the second mating face is configured to be coupled to the platform body such that the flow of fluid can be received by a platform body channel of the platform body.

In any of the foregoing transfer tubes, the flow of fluid received by the inlet is in an axial direction and the flow of fluid flowing out of the outlet is in a radial direction.

In any of the foregoing transfer tubes, the outer diameter platform is coupled to a vane of a high pressure turbine section of the gas turbine engine.

Any of the foregoing transfer tubes may also include a first straight section positioned between the first end and the curved section and having a first distance and a second straight section positioned between the second end and the curved section and having a second distance.

In any of the foregoing transfer tubes, a ratio of the first distance to the second distance is between 2 to 1 and 4 to 1.

In any of the foregoing transfer tubes, the main body includes at least one of an austenitic nickel-chromium-based alloy or a high performance nickel-based superalloy.

Also described is a turbine section of a gas turbine engine. The turbine section includes a vane defining a vane cavity and an outer diameter platform having a platform body defining a platform body channel and a hook defining a hook channel. The turbine section also includes a transfer tube having a main body having a first end coupled to the hook and defining an inlet configured to receive a flow of fluid from the hook channel and a second end coupled to the platform body and defining an outlet such that the platform body channel can receive the flow of fluid via the outlet.

In any of the foregoing turbine sections, the main body has a curved section having an angle of at least 20 degrees.

Any of the foregoing turbine sections may also include a first straight section positioned between the first end and the curved section and having a first distance and a second straight section positioned between the second end and the curved section and having a second distance.

In any of the foregoing turbine sections, a ratio of the first distance to the second distance is between 2 to 1 and 4 to 1.

In any of the foregoing turbine sections, the transfer tube further includes a first mating face coupled to the first end of the main body and a second mating face coupled to the second end of the main body.

In any of the foregoing turbine sections, the transfer tube further includes a first flange coupled to the first end and a second flange coupled to the second end, the first flange defining the first mating face and the second flange defining the second mating face.

Also described is a gas turbine engine that includes a compressor section, a combustor section, and a turbine section. The turbine section includes a vane defining a vane cavity and an outer diameter platform having a platform body defining a platform body channel and a hook defining a hook channel. The turbine section also includes a transfer tube having a main body having a first end coupled to the hook and defining an inlet configured to receive a flow of fluid from the hook channel, a second end coupled to the platform body and defining an outlet such that the platform body channel can receive the flow of fluid via the outlet, and a curved section.

In any of the foregoing gas turbine engines, the turbine section further includes a first straight section positioned between the first end and the curved section and having a first distance and a second straight section positioned between the second end and the curved section and having a second distance and wherein a ratio of the first distance to the second distance is between 2 to 1 and 4 to 1.

In any of the foregoing gas turbine engines, the transfer tube further includes a first flange coupled to the first end and defining a first mating face and a second flange coupled to the second end and defining a second mating face.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
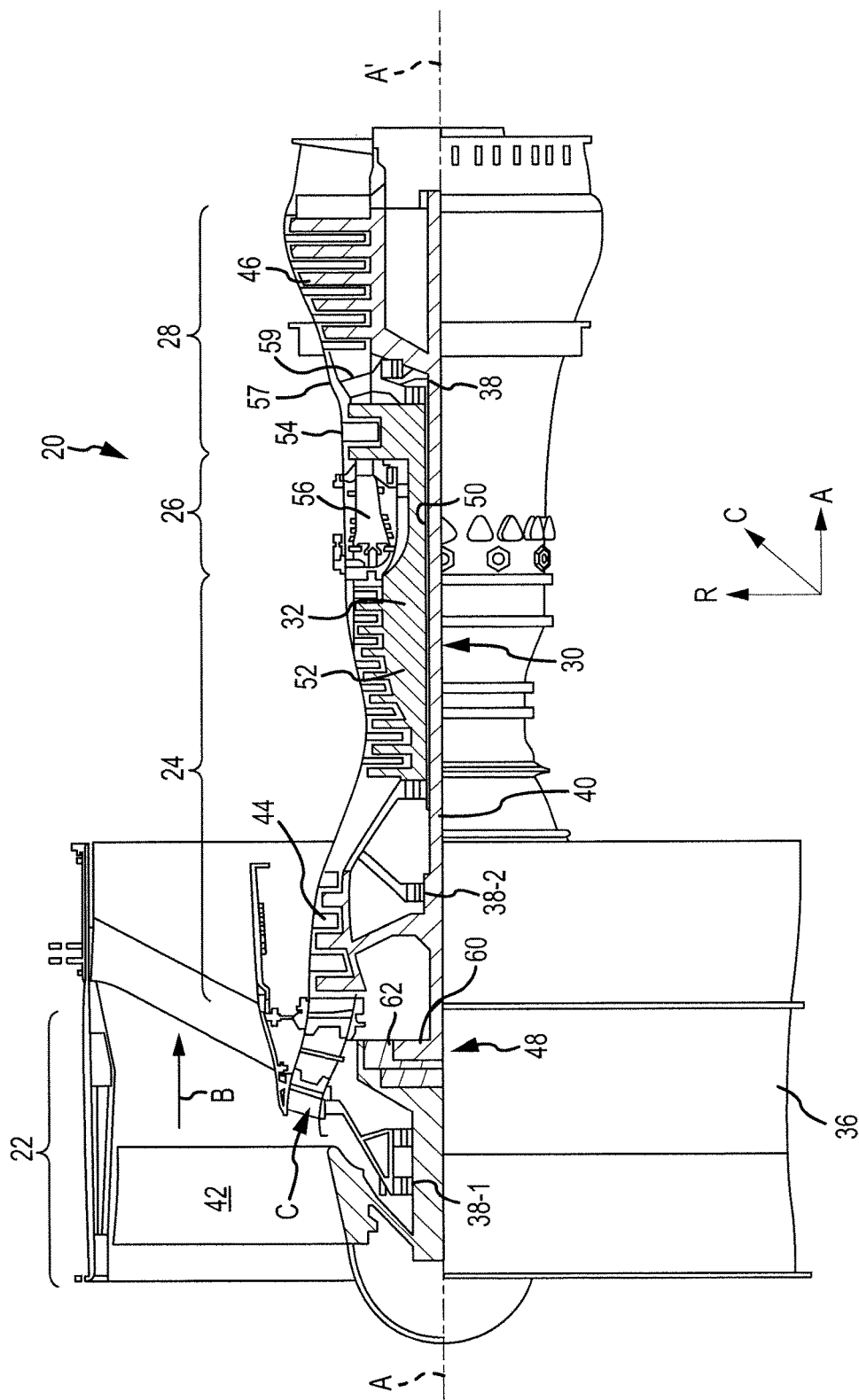
FIG. 1 is a cross-sectional view of an exemplary gas turbine engine, in accordance with various embodiments.

With reference to FIG. 1, a gas turbine engine 20 is provided. An A-R-C axis illustrated in each of the figures illustrates the axial (A), radial (R) and circumferential (C) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 20 may be a two-spool turbofan that generally incorporates a fan section 22, a compressor section 24, a combustor section 26 and a turbine section 28. Alternative engines include an augmentor section among other systems or features. In operation, fan section 22 drives air along a bypass flow-path B while compressor section 24 drives air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan 42 at a lower speed than low speed spool 30. Geared architecture 48 includes a gear assembly 60 enclosed within a gear housing 62. Gear assembly 60 couples inner shaft 40 to a rotating fan structure. High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass ratio geared aircraft engine. The bypass ratio of gas turbine engine 20 may be greater than about six (6). The bypass ratio of gas turbine engine 20 may also be greater than ten (10:1). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). The diameter of fan 42 may be significantly larger than that of the low pressure compressor section 44, and the low pressure turbine 46 may have a pressure ratio that is greater than about five (5:1). The pressure ratio of low pressure turbine 46 is measured prior to inlet of low pressure turbine 46 as related to the pressure at the outlet of low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
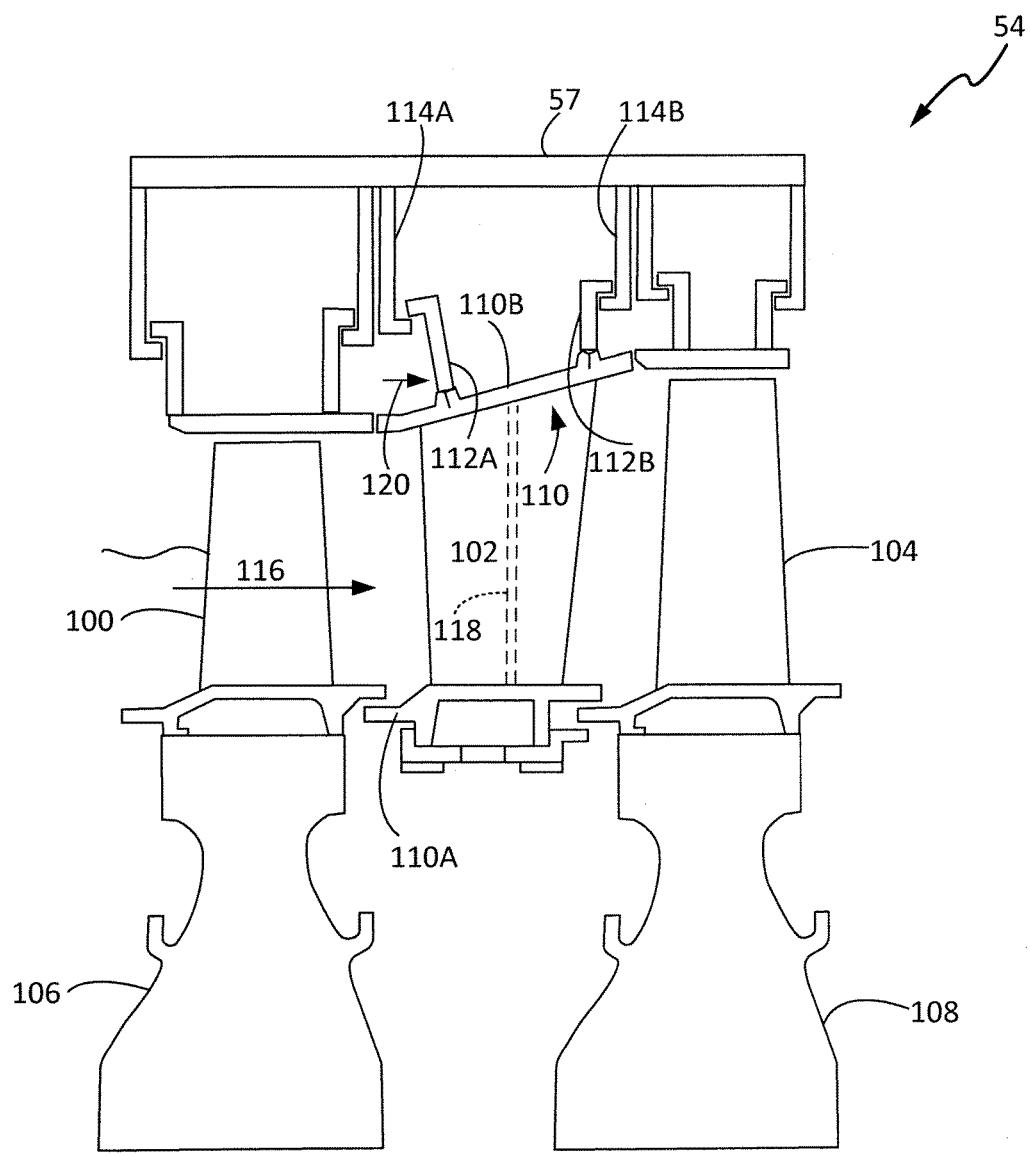
FIG. 2 is a cross-sectional view of a portion of a high pressure turbine of the gas turbine engine of FIG. 1, in accordance with various embodiments.

With reference now to FIG. 2, a portion of high pressure turbine section 54 may include a first rotor 100, a second rotor 104, and a vane 102 positioned axially between first rotor 100 and second rotor 104. A first rotor disk 106 is positioned radially inward from and coupled to first rotor 100 and a second rotor disk 108 is positioned radially inward from and coupled to second rotor 104. Vane 102 is coupled to platforms 110 including an inner diameter platform 110A on a radially inward end of vane 102 and an outer diameter platform 110B on a radially outer end of vane 102.

Outer diameter platform 110B includes a hook 112A and a hook 112B. Hook 112A and hook 112B are configured to attach to a hook 114A and a hook 114B, respectively, of mid-turbine frame 57.

With brief reference to FIGS. 1 and 2, high pressure turbine section 54 may receive a flow of fluid from combustor section 26 as shown by arrow 116. The flow of fluid causes first rotor 100 and first rotor disk 106 to rotate about centerline A-A'. Because vane 102 is coupled to mid-turbine frame 57, vane 102 does not rotate relative to first rotor 100 and first rotor disk 106. Vane 102 is instead designed to condition the flow of fluid before it is received by second rotor 104. After being conditioned by vane 102, the fluid is received by second rotor 104, causing rotation of second rotor 104 and second rotor disk 108 about centerline A-A'.

Due to the proximity of high pressure turbine section 54 to combustor section 26 and the pressure of the fluid flowing through high pressure turbine section 54, temperatures within high pressure turbine section 54 may be relatively high while gas turbine engine 20 is operating. In that regard, it is desirable to cool the components of high pressure turbine section 54 to extend the lifetime of these components. In that regard, vane 102 defines or includes a vane cavity 118 that is configured to receive a flow of coolant, such as air, which may cool the surfaces of vane 102. The coolant may flow forward or aft. For example, the coolant may flow aft as shown by arrow 120. It is desirable to direct at least a portion of the coolant into vane cavity 118 in order to cool vane 102.

Figure 3:
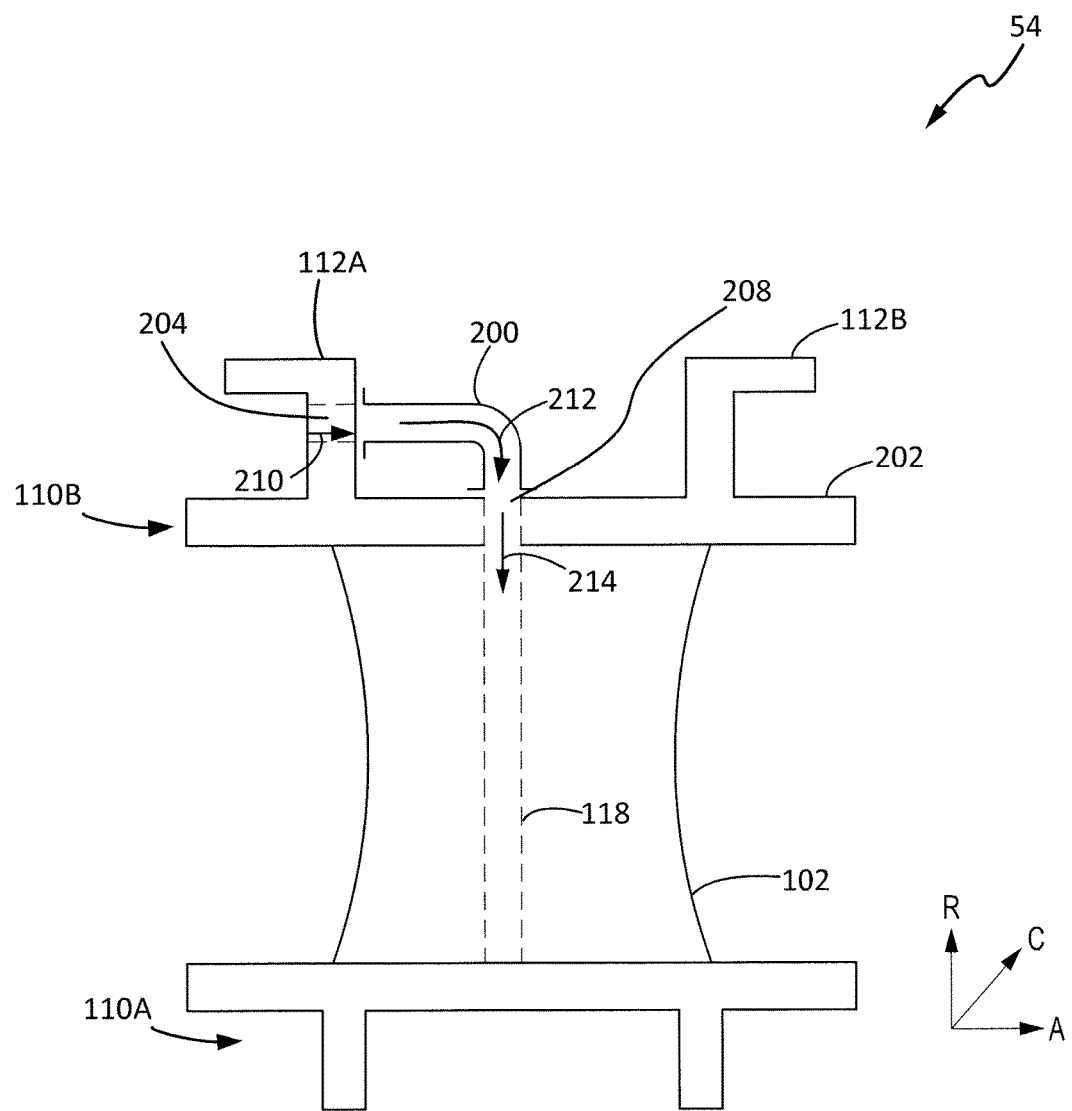
FIG. 3 is a cross-sectional view of a vane and an outer diameter platform of the high pressure turbine of FIG. 2, in accordance with various embodiments.

In that regard and with reference to FIG. 3, hook 112A of outer diameter platform 110B may define a hook channel 204 for receiving the flow of coolant. Similarly, a platform body 202 of outer diameter platform 110B may define a platform body channel 208 for receiving the coolant and allowing it to flow into vane cavity 118. In order to transfer the coolant from hook channel 204 to platform body channel 208, a transfer tube 200 may be coupled to outer diameter platform 110B. When transfer tube 200 is coupled to outer diameter platform 110B, fluid may flow aft through hook channel 204, be received by transfer tube 200 and turn in a radial direction, as illustrated by arrow 212, and flow out of transfer tube 200 through platform body 202 and into vane cavity 118 in the radial direction, as illustrated by arrow 214.

Traditional outer diameter platforms may include a solid mass of material in an area defined by a hook and a body that is integral to the outer diameter platform and defines a coolant channel between the hook and the platform body. Because of the amount of material used to define this channel, the outer diameter platform may be relatively stiff. While the vane conditions the flow from the gas path, the pressure and velocity of the fluid may create a relatively high stress in the outer diameter platform. Due to the stiffness of the material, the material defining the coolant channel may crack or otherwise begin to degrade in response to this relatively high stress.

To reduce the likelihood of this degradation, transfer tube 200 may be manufactured separately than, and thus not be integral to, outer diameter platform 110B. Stated differently, outer diameter platform 110B and transfer tube 200 may be monolithic. For example, outer diameter platform 110B may be cast as a single piece and transfer tube 200 may be cast as a separate single piece. Transfer tube 200 may then be coupled to outer diameter platform 110B such as by brazing or welding. In various embodiments, transfer tube 200 may be coupled to hook 112A and/or platform body 202 in ways other than brazing or welding, such as using screws, rivets, or the like. When transfer tube 200 is coupled to outer diameter platform 110B instead of integral to outer diameter platform 110B, outer diameter platform 110B is less stiff, resulting in transfer tube 200 resisting cracking or other degradation.

With reference to FIGS. 1 and 3, a transfer tube may be used in other portions of gas turbine engine 20. For example, a transfer tube may be used in any portion of compressor section 24 or turbine section 28, and/or may be used on an inner diameter platform or outer diameter platform. A transfer tube may include one or more materials selected based on the expected operating temperatures and pressures of the environment in which the transfer tube is positioned. For example, transfer tube 200 within high pressure turbine section 54 may comprise a material having greater temperature and pressure resistance than a transfer tube used in low pressure turbine section 46.

Returning reference to FIG. 3, because transfer tube 200 is used in high pressure turbine section, a material for transfer tube 200 being resistant to relatively high temperatures and pressures may be selected. For example, transfer tube 200 may include an austenitic nickel-chromium-based alloy (e.g., an alloy having a nominal composition of nickel fifty-eight percent (58%), chromium 20% to 23%, iron up to 5%, molybdenum between 8% to 10%, niobium (plus tantalum) between 3.15% to 4.15% that is available under the trade name INCONEL 625™, available from Special Metals Corporation of New Hartford, N.Y., USA). In various embodiments, transfer tube 200 may also include a high performance nickel-based super alloy (e.g., an alloy having a nominal composition of nickel 58%, chromium 19%, cobalt 13%, molybdenum 4%, titanium 3%, aluminum 1.4% that is available under the trade name Waspaloy™, also available from Special Metals Corporation of New Hartford, N.Y., USA).

Figure 4:
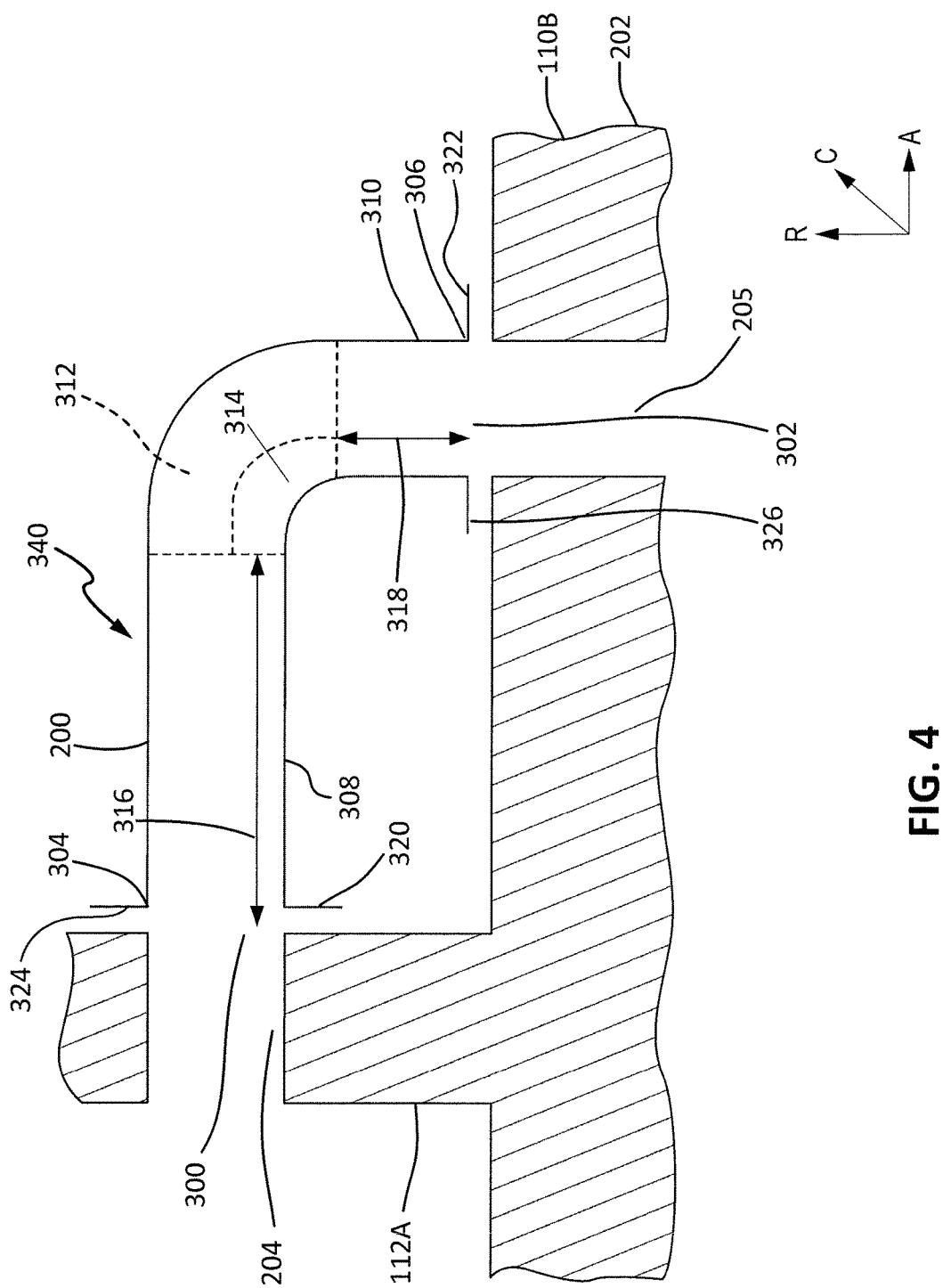
FIG. 4 is an enlarged view of a transfer tube used in the high pressure turbine of FIG. 2, in accordance with various embodiments.

With reference now to FIG. 4, transfer tube 200 may have a first end 304 defining an inlet 300 and a second end 306 defining an outlet 302. Transfer tube 200 may also include a curved section 312 that turns the flow of coolant at a predetermined angle 314. In various embodiments, angle 314 may be at least twenty degrees (20°). In various embodiments, angle 314 may be between 80° and 100°.

In various embodiments, transfer tube 200 may include a first straight section 308 positioned between first end 304 and curved section 312. Transfer tube 200 may also include a second straight section 310 positioned between second end 306 and curved section 312. First straight section and 308 and second straight section 310 may include no curvature, or a nominal amount of curvature, such as between 0° and 5°. A main body 340 of the transfer tube 200 may include first straight section 308, second straight section 310, and curved section 312. In various embodiments, transfer tube 200 may include neither or one of first straight section 308 and second straight section 310. In that regard, main body 340 may include one or more of first straight section 308, second straight section 310, or curved section 312.

First straight section 308 may have a first distance 316 in the axial direction and second straight section 310 may have a second distance 318 in the radial direction. In various embodiments, first distance 316 may be in a direction other than the axial direction and/or second distance 318 may be in a direction other than the radial direction. In various embodiments, a ratio of first distance 316 to second distance 318 may be between two-to-1 (2:1) and 4:1.

Transfer tube 200 may include a first mating face 324 positioned at first end 304. First mating face 324 may be configured to be positioned against and coupled to hook 112A. Similarly, transfer tube 200 may include a second mating face 326 configured to be positioned against and coupled to platform body 202. In various embodiments, transfer tube 200 may include a first flange 320 positioned at first end 304 and a second flange 322 positioned at second end 306. First flange 320 and second flange 322 may define first mating face 324 and second mating face 326, respectively. In various embodiments, first flange 320 may be welded or brazed onto hook 112A and/or second flange 322 may be welded and/or brazed to platform body 202.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A transfer tube for use with an airfoil of a gas turbine engine, the airfoil being coupled to an outer diameter platform, the transfer tube comprising:
    a main body having a first end defining an inlet configured to receive a flow of fluid and a second end defining an outlet for the flow of fluid, the main body having a curved section;
    a first mating face coupled to the first end of the main body and configured to be coupled to a hook of the outer diameter platform such that the inlet receives the flow of fluid from a hook channel of the hook in an axial direction; and
    a second mating face coupled to the second end of the main body and configured to be coupled to a platform body of the outer diameter platform such that the flow of fluid can be received by a platform body channel of the platform body in a radial direction,
    wherein the transfer tube is configured to allow fluid to flow between the hook of the outer diameter platform and the platform body of the outer diameter platform, and the platform is configured to be coupled to a vane of a turbine section of the gas turbine engine.

2. The transfer tube of claim 1, wherein the curved section has an angle of at least 20 degrees.

3. The transfer tube of claim 2, wherein the angle is between 80 degrees and 100 degrees.

4. The transfer tube of claim 1, further comprising a first flange coupled to the first end and a second flange coupled to the second end, the first flange defining the first mating face and the second flange defining the second mating face.

5. The transfer tube of claim 1, further comprising a first straight section positioned between the first end and the curved section and having a first distance and a second straight section positioned between the second end and the curved section and having a second distance.

6. The transfer tube of claim 5, wherein a ratio of the first distance to the second distance is between 2 to 1 and 4 to 1.

7. The transfer tube of claim 1, wherein the main body includes at least one of an austenitic nickel-chromium-based alloy or a high performance nickel-based superalloy.

8. A turbine section of a gas turbine engine, comprising:
    a vane defining a vane cavity;
    an outer diameter platform having a platform body defining a platform body channel and a hook defining a hook channel; and
    a transfer tube having a main body having a first end coupled to the hook and defining an inlet configured to receive a flow of fluid from the hook channel and a second end coupled to the platform body and defining an outlet such that the platform body channel can receive the flow of fluid via the outlet.

9. The turbine section of claim 8, wherein the main body has a curved section having an angle of at least 20 degrees.

10. The turbine section of claim 9, further comprising a first straight section positioned between the first end and the curved section and having a first distance and a second straight section positioned between the second end and the curved section and having a second distance.

11. The turbine section of claim 10, wherein a ratio of the first distance to the second distance is between 2 to 1 and 4 to 1.

12. The turbine section of claim 8, wherein the transfer tube further includes a first mating face coupled to the first end of the main body and a second mating face coupled to the second end of the main body.

13. The turbine section of claim 12, wherein the transfer tube further includes a first flange coupled to the first end and a second flange coupled to the second end, the first flange defining the first mating face and the second flange defining the second mating face.

14. A gas turbine engine, comprising:
a compressor section;
a combustor section; and
a turbine section having:
a vane defining a vane cavity,
an outer diameter platform having a platform body defining a platform body channel and a hook defining a hook channel, and
a transfer tube having a main body having a first end coupled to the hook and defining an inlet configured to receive a flow of fluid from the hook channel, a second end coupled to the platform body and defining an outlet such that the platform body channel can receive the flow of fluid via the outlet, and a curved section.

15. The gas turbine engine of claim 14, wherein the turbine section further includes a first straight section positioned between the first end and the curved section and having a first distance and a second straight section positioned between the second end and the curved section and having a second distance and wherein a ratio of the first distance to the second distance is between 2 to 1 and 4 to 1.

16. The gas turbine engine of claim 14, wherein the transfer tube further includes a first flange coupled to the first end and defining a first mating face and a second flange coupled to the second end and defining a second mating face.

* * * * *